United States Patent
Delgado Marquez et al.

(10) Patent No.: US 10,801,545 B2
(45) Date of Patent: Oct. 13, 2020

(54) LOAD-SHARING BEARING SYSTEM AND AN ASSOCIATED METHOD THEREOF

(71) Applicant: General Electric Company, Schenectady, NY (US)

(72) Inventors: Adolfo Delgado Marquez, Niskayuna, NY (US); Jeremy Daniel Van Dam, West Coxsackie, NY (US); Stephen Masao Sakamoto, Edmond, OK (US); Rene Jose Garcia, Edmond, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 748 days.

(21) Appl. No.: 14/730,899

(22) Filed: Jun. 4, 2015

(65) Prior Publication Data
US 2016/0356275 A1    Dec. 8, 2016

(51) Int. Cl.
*F16C 17/26*    (2006.01)
*F04D 29/041*    (2006.01)
(Continued)

(52) U.S. Cl.
CPC .............. *F16C 17/26* (2013.01); *F04D 13/10* (2013.01); *F04D 29/0413* (2013.01);
(Continued)

(58) Field of Classification Search
None
See application file for complete search history.

(56) References Cited

U.S. PATENT DOCUMENTS

| | | | |
|---|---|---|---|
| 2,912,289 A | | 11/1959 | Waldschmidt |
| 3,183,048 A | * | 5/1965 | Komor ................ F04D 29/0413 384/304 |

(Continued)

FOREIGN PATENT DOCUMENTS

CN    201671873 U    12/2010

OTHER PUBLICATIONS

Bhasker et al., "Structural Analysis of Thrust Bearing Support Pad", Altair Technology Conference, Simulate to Innovate, pp. 1-4, 2013.
(Continued)

*Primary Examiner* — Peter J Bertheaud
*Assistant Examiner* — Geoffrey S Lee (57) ABSTRACT

A bearing system includes a stationary element, a housing, a shaft, a first and second thrust collars, a first and second bearing units, and a mechanical component. The housing includes a first end portion and a second end portion contacting the stationary element. The shaft and second thrust collar are disposed within the housing. The first and second thrust collars are spaced apart from each other and coupled to the shaft. The first bearing unit is disposed between the first thrust collar and a first side of second thrust collar. The first bearing unit contacts the first thrust collar and coupled to the first end portion. The second bearing unit is disposed between a second side of second thrust collar and second end portion. The second bearing unit contacts second thrust collar. The mechanical component extends along the shaft and contacts the second bearing unit and second end portion.

18 Claims, 4 Drawing Sheets

(51) Int. Cl.
  *F16C 41/02* (2006.01)
  *F16C 17/04* (2006.01)
  *F04D 13/10* (2006.01)
  *F16C 17/06* (2006.01)

(52) U.S. Cl.
  CPC ............ *F16C 41/02* (2013.01); *F16C 17/047* (2013.01); *F16C 17/06* (2013.01); *F16C 2360/44* (2013.01)

(56) References Cited

U.S. PATENT DOCUMENTS

| | | | |
|---|---|---|---|
| 3,326,612 A | | 6/1967 | Schaefer |
| 3,734,581 A | * | 5/1973 | LeBreton ................ F16C 17/06 384/304 |
| 4,042,284 A | * | 8/1977 | Coster ................ B29C 47/0801 384/613 |
| 4,363,608 A | * | 12/1982 | Mulders ................ F16C 19/36 384/124 |
| 4,867,633 A | | 9/1989 | Gravelle |
| 5,741,116 A | * | 4/1998 | Hudson ................ F16C 17/06 415/104 |
| 6,361,217 B1 | * | 3/2002 | Beasley ................ E21B 4/003 384/121 |
| 7,987,913 B2 | * | 8/2011 | Parmeter ............... E21B 43/128 166/107 |
| 2002/0196988 A1 | * | 12/2002 | Tsui ........................ F04D 13/08 384/121 |
| 2009/0272581 A1 | * | 11/2009 | Beylotte ................ E21B 4/02 175/107 |
| 2012/0263610 A1 | * | 10/2012 | Tetzlaff ............... F04D 29/0476 417/410.1 |
| 2015/0354582 A1 | * | 12/2015 | Tanner .................... F04D 13/08 415/1 |
| 2017/0058907 A1 | * | 3/2017 | Delgado Marquez .. F16C 39/02 |

OTHER PUBLICATIONS

"PetroCeram® Thrust Bearings", Ceramics Make the Difference, Ceradyne, Inc., pp. 1-2. downloaded from http://petroceram.de/downloads/Downloads/PC_Leaflet_THRUST_BEARINGS.pdf on Dec. 26, 2014.

* cited by examiner

LOAD-SHARING BEARING SYSTEM AND AN ASSOCIATED METHOD THEREOF

BACKGROUND

The present patent application relates generally to a bearing system, and, more particularly to a load-sharing thrust bearing system used in an apparatus such as an electrical submersible pump (ESP).

In a hydrocarbon reservoir, a fluid-lifting apparatus is generally used for moving a production fluid from a wellbore to a distant storage facility. One such fluid-lifting apparatus includes an electrical submersible pump (ESP) having a pump, a motor, and a seal unit.

During operation of the ESP, impellers rotate within the pump for moving the production fluid from the wellbore. Generally, the rotating impellers exert a thrust load on the ESP and such a thrust load is supported by a thrust bearing unit disposed within the ESP. The thrust bearing unit with a larger diameter has a greater load bearing capacity. However, the wellbore has a size constraint which in turn restrains the diameter of the thrust bearing unit which can be used in the ESP, thereby affecting the load bearing capacity of the thrust bearing unit. In such a scenario, a backup thrust bearing unit may be used to enhance the load bearing capacity. However, such a configuration is not sufficient to properly distribute and/or regulate the thrust load between the thrust bearing units, resulting in either overloading or uneven wear and tear of the thrust bearing unit.

Accordingly, there is a need for an improved bearing system and an associated method for distributing an axial thrust load between a plurality of thrust bearing units.

BRIEF DESCRIPTION

In accordance with one exemplary embodiment, a bearing system is disclosed. The bearing system includes a stationary element and a housing having a first end portion and a second end portion contacting the stationary element. The bearing system further includes a shaft disposed at least partially within the housing. Further, the bearing system includes a first thrust collar and a second thrust collar axially spaced apart from each other and coupled to the shaft. The second thrust collar is disposed within the housing. Further, the bearing system includes a first bearing unit disposed between the first thrust collar and a first side of the second thrust collar. The first bearing unit contacts the first thrust collar and is coupled to the first end portion. The bearing system further includes a second bearing unit disposed between a second side opposite to the first side of the second thrust collar and the second end portion. The second bearing unit contacts the second thrust collar. Further, the bearing system includes a mechanical component extending along the shaft and contacting the second bearing unit and the second end portion.

In accordance with another exemplary embodiment, an apparatus is disclosed. The apparatus includes a pump, a motor, and a seal unit disposed between and coupled to the pump and the motor. The seal unit includes a casing and a bearing system. The bearing system includes a stationary element coupled to the casing. Further, the bearing system includes a housing having a first end portion and a second end portion contacting the stationary element. The bearing system further includes a shaft disposed at least partially within the housing. The bearing system further includes a first thrust collar and a second thrust collar axially spaced apart from each other and coupled to the shaft. The second thrust collar is disposed within the housing. Further, the bearing system includes a first bearing unit disposed between the first thrust collar and a first side of the second thrust collar. The first bearing unit contacts the first thrust collar and is coupled to the first end portion. The bearing system further includes a second bearing unit disposed between a second side opposite to the first side of the second thrust collar and the second end portion. The second bearing unit contacts the second thrust collar. Further, the bearing system includes a mechanical component extending along the shaft and contacting the second bearing unit and the second end portion.

In accordance with yet another exemplary embodiment, a method is disclosed. The method involves applying an axial thrust load on a shaft disposed at least partially within a housing having a first end portion and a second end portion. The second end portion contacts a stationary element. The method further involves biasing a first thrust collar against a first bearing unit. The first thrust collar is coupled to the shaft and the first bearing unit is coupled to the first end portion. Further, the method involves moving the housing via the first bearing unit, along an axial direction of the shaft and bending at least one flexible element of the second end portion via at least one projection of the stationary element. The method further involves pushing a mechanical component along the axial direction via the at least one flexible element to bias a second bearing unit against a second thrust collar. The first thrust collar and the second thrust collar are axially spaced apart from each other and coupled to the shaft. The second thrust collar is disposed within the housing and the first bearing unit is disposed between the first thrust collar and a first side of the second thrust collar. The second bearing unit is disposed between a second side opposite to the first side of the second thrust collar and the second end portion. The mechanical component extends along the shaft and contacts the second bearing unit and the second end portion. Further, the method involves distributing the axial thrust load between the first bearing unit and the second bearing unit.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Embodiments discussed herein disclose a bearing system, for example, a load-sharing thrust bearing system for an apparatus such as an electrical submersible pump (ESP). The exemplary bearing system is designed for distributing an axial thrust load between a first bearing unit and a second bearing unit which are disposed axially in tandem along a shaft of the ESP. In certain embodiments, the bearing system includes a stationary element and a housing having a first end portion and a second end portion contacting the stationary element. The bearing system further includes a shaft disposed at least partially within the housing. Further, the bearing system includes a first thrust collar and a second thrust collar axially spaced apart from each other and coupled to the shaft. The second thrust collar is disposed within the housing. Further, the bearing system includes a first bearing unit disposed between the first thrust collar and a first side of the second thrust collar. The first bearing unit contacts the first thrust collar and is coupled to the first end portion of the housing. The bearing system further includes a second bearing unit disposed between a second side opposite to the first side of the second thrust collar and the second end portion of the housing. The second bearing unit contacts the second thrust collar. Further, the bearing system includes a mechanical component extending along the shaft and contacting the second bearing unit and the second end portion of the housing.

Figure 1:
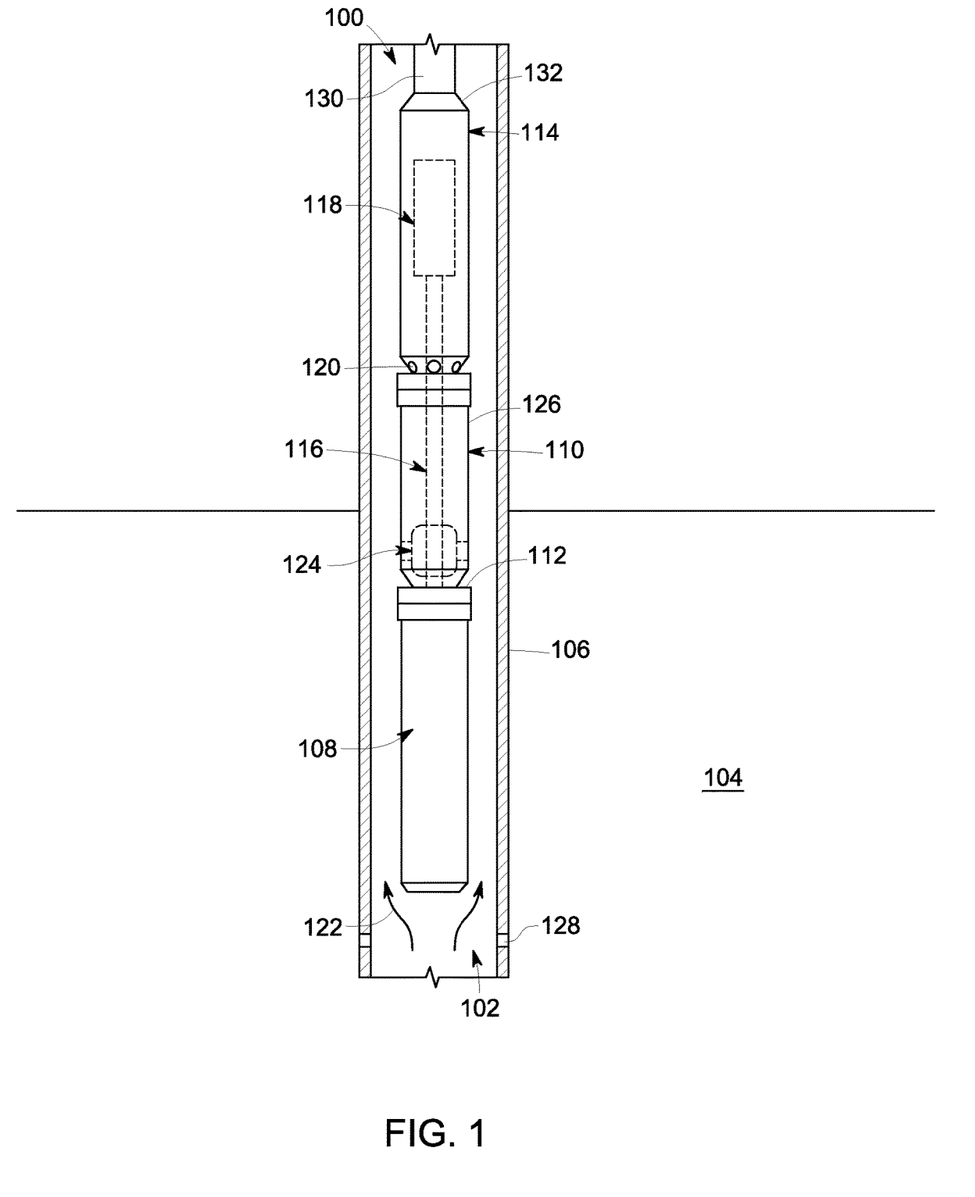
FIG. 1 is a schematic sectional view of an electrical submersible pump disposed in a wellbore in accordance with one exemplary embodiment.

FIG. 1 illustrates a schematic sectional view of an apparatus 100 in accordance with one exemplary embodiment. In the embodiment shown, the apparatus 100 is an electrical submersible pump (ESP). It should be noted herein that the terms "apparatus" and "ESP" may be used interchangeably. In certain other embodiments, the apparatus 100 may be a drilling machine, a turbo machine, a rotor bearing system, or the like. The illustrated embodiment of the apparatus 100 should not be construed as a limitation of the present invention.

The ESP 100 is disposed within a wellbore casing 106 of a wellbore 102 inserted within a hydrocarbon reservoir 104. In the embodiment shown, the ESP 100 includes a motor 108, a seal unit 110 coupled to an upper end portion 112 of the motor 108, and a pump 114 disposed above and coupled to the seal unit 110. The ESP 100 further includes a shaft 116 extending from the motor 108 to the pump 114 through the seal unit 110. Specifically, one end of the shaft 116 is coupled to the motor 108 and another end of the shaft 116 is coupled to an impeller 118 disposed within the pump 114. Although the shaft 116 is shown as a single member in the embodiment shown, it should be noted herein that the shaft 116 may include a plurality of segments.

The pump 114 further includes a plurality of fluid inlets 120 for feeding a production fluid 122 from the wellbore 102. The ESP 100 may optionally include a liquid-gas separator (not shown in FIG. 1) disposed between the seal unit 110 and the pump 114, which may be configured to separate a liquid phase from a gaseous phase of the production fluid. In such embodiments, only the liquid phase is fed to the pump 114 via the plurality of fluid inlets 120.

The seal unit 110 is configured to equalize pressure between an interior of the motor 108 and the wellbore 102, to absorb thrust generated by the shaft 116, to compensate for the thermal expansion of a motor lubricant (not shown in FIG. 1), and to prevent the production fluid 122 from entering an interior of the motor 108. In one embodiment, the ESP 100 further includes a bearing system 124 disposed within the seal unit 110, surrounding the shaft 116 and coupled to a casing 126 of the seal unit 110. In certain embodiments, the bearing system 124 includes a thrust bearing unit such as a tilting pad and/or a fixed pad thrust bearing. In certain other embodiments, the bearing unit 124 may be disposed within the motor 108 or within the pump 114 depending on the application and design criteria. The seal unit 110 absorbs an axial thrust generated by the pump 114 and dissipates heat generated by the thrust bearing unit.

During operation, the production fluid 122 which may include liquid hydrocarbon, gas hydrocarbon, and/or water, enters the wellbore 102 from the hydrocarbon reservoir 104, through perforations 128 formed in the wellbore casing 106. The motor 108 is driven by a power source (not shown in FIG. 1) causing the shaft 116 to rotate which then rotates the impeller 118. The production fluid 122 in the wellbore 102, is fed to the pump 114 through the plurality of fluid inlets 120. The production fluid 122 is pressurized by the rotating impeller 118 and transported to a distant storage facility (not shown in FIG. 1) via one or more pipes 130 coupled to an upper end portion 132 of the pump 114. The rotating impeller 118 exerts a downward thrust load. The bearing system 124 is configured to support such a downward thrust load by distributing the thrust load between the thrust bearings (not shown in FIG. 1). The bearing system 124 and the thrust bearing units are discussed in greater detail below.

Figure 2:
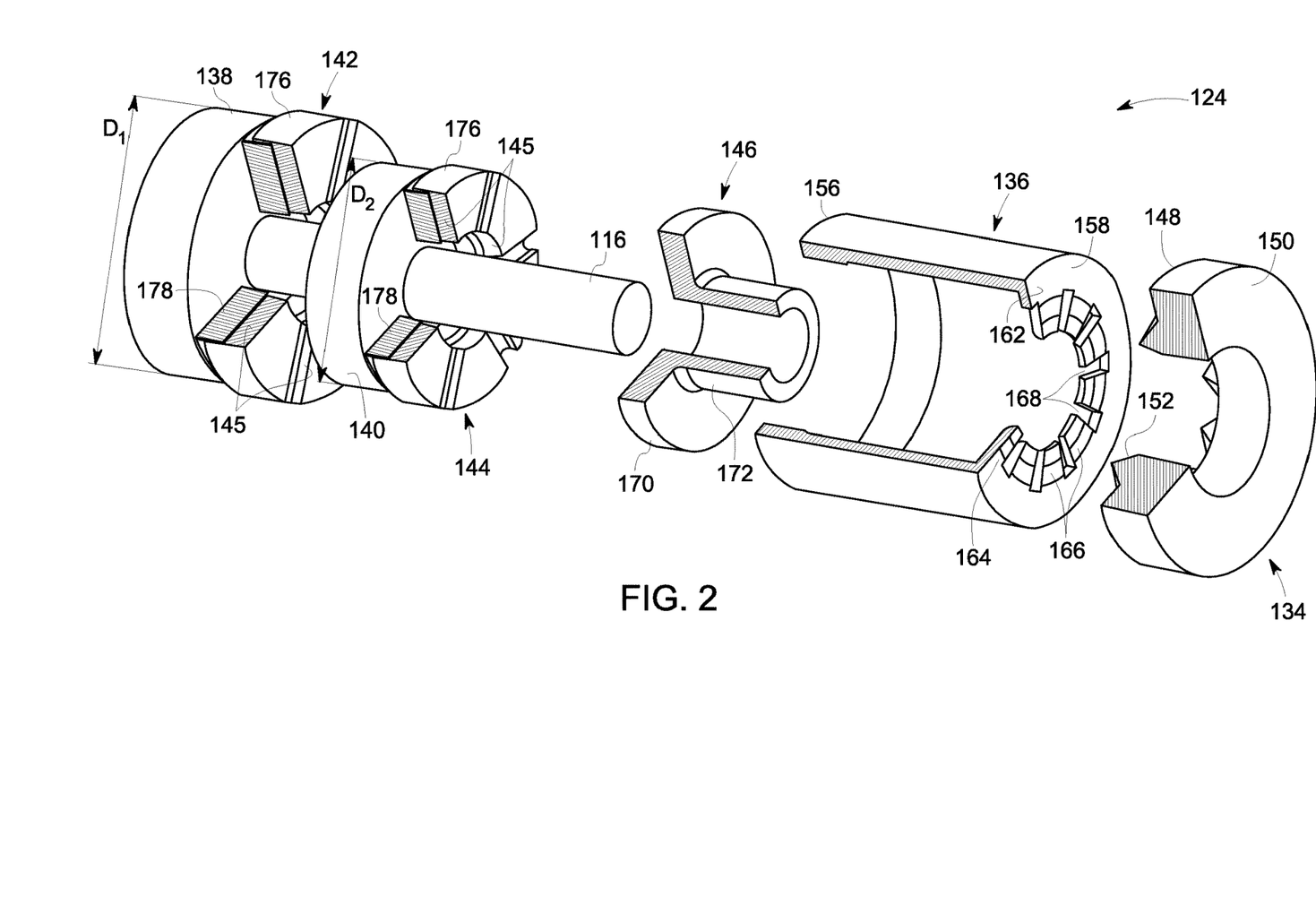
FIG. 2 is an exploded perspective view of a bearing system in accordance with one exemplary embodiment.

FIG. 2 illustrates an exploded perspective view of the bearing system 124 in accordance with exemplary embodiment. The bearing system 124 includes a stationary element 134, a housing 136, a shaft 116, a first thrust collar 138, a second thrust collar 140, a first bearing unit 142, a second bearing unit 144, and a mechanical component 146. In the illustrated embodiment, only a portion of the stationary element 134, the housing 136, the first bearing unit 142, the second bearing unit 144, and the mechanical component 146 are shown to simplify the illustration of the bearing system 124. In certain embodiments, the bearing system 124 may include more than two bearing units and thrust collars, depending on the application and design criteria. The illustrated embodiment should not be construed as a limitation of the present invention.

The stationary element 134 is an annular element having a first end portion 148 and a second end portion 150. The stationary element 134 further includes a plurality of projections 152 in the form of fulcrums disposed spaced apart from each other along the first end portion 148. In another embodiment, the stationary element 134 includes a single projection formed continuously along the first end portion 148. The single projection may be flat projection, a stepped projection, or the like. In one embodiment, the plurality of projections 152 is configured to push at least a portion of the housing 136 along an axial direction of the shaft 116.

The housing 136 is a cylindrical component having a first end portion 156 and a second end portion 158 opposite to the first end portion 156. The second end portion 158 includes a rigid portion 162 and a flexible portion 164. In the embodiment shown, the flexible portion 164 includes a plurality of flexible elements 166 spaced apart from each other. In one embodiment, the flexible portion 164 is integrated to the rigid portion 162. A plurality of slots 168 is formed between the plurality of flexible elements 166. The size and shape of the plurality of slots 168 and the flexible elements 166 may vary depending on the application. The plurality of flexible elements 166 is configured to bend along an axial direction of the shaft 116. In certain other embodiments, the flexible portion 164 is coupled to the rigid portion 162 via a suitable coupling mechanism. In such an embodiment, the flexible portion 164 and the rigid portion 162 may be made of different materials. In another embodiment, the housing 136 includes a single flexible element formed continuously along the flexible portion 164 and coupled to the rigid portion 162. The single flexible element may be flat flexible element, a stepped flexible element, or the like.

The mechanical component 146 includes a first annular component 170 and a second annular component 172 coupled to the first annular component 170. The first annular component 170 is disposed within the housing 136. The second annular component 172 is disposed along the shaft 116 and extends between the second end portion 158 of the housing 136 and the stationary element 134. The shaft 116 is disposed at least partially within the housing 136 and coupled to the motor and the pump (as shown in FIG. 1). Each of the first bearing unit 142 and the second bearing unit 144 include a thrust bearing 145 arranged in a form of a plurality of sectors. Each thrust bearing 145 includes a metal base 176 and a pad 178. In one embodiment, the pad 178 is rigidly coupled to the metal base 176 to form a fixed pad thrust bearing. In another embodiment, the pad 178 is pivotable about one or more ridges (not shown in FIG. 2) of the metal base 176 to form a tilting pad thrust bearing. In one example, the first and second bearing units 142, 144 may include the fixed pad thrust bearing for the ESP 100 (shown in FIG. 1) operating with a substantially low thrust load.

The first bearing unit 142 has a first diameter "$D_1$" and the second bearing unit 144 has a second diameter "$D_2$" different from the first diameter "$D_1$". In the embodiment shown, the first diameter "$D_1$" is greater than the second diameter "$D_2$". In another embodiment, the first diameter "D1" may be approximately equal to the second diameter "D2", depending on the application and design criteria. The number of the thrust bearings in the first and second bearing units 142, 144 may vary depending on the application and design criteria. The first and second bearing units 142, 144 contacts the first and second thrust collars 138, 140 respectively.

In the embodiment shown, the first thrust collar 138 and the second thrust collar 140 are axially spaced apart from each other and coupled to the shaft 116. The illustrated first and second thrust collars 138, 140 are annular components. The first thrust collar 138 has a diameter substantially equal to the first diameter "$D_1$" of the first bearing unit 142. The second thrust collar 140 has a diameter approximately equal to the second diameter "$D_2$" of the second bearing unit 144.

Figure 3:
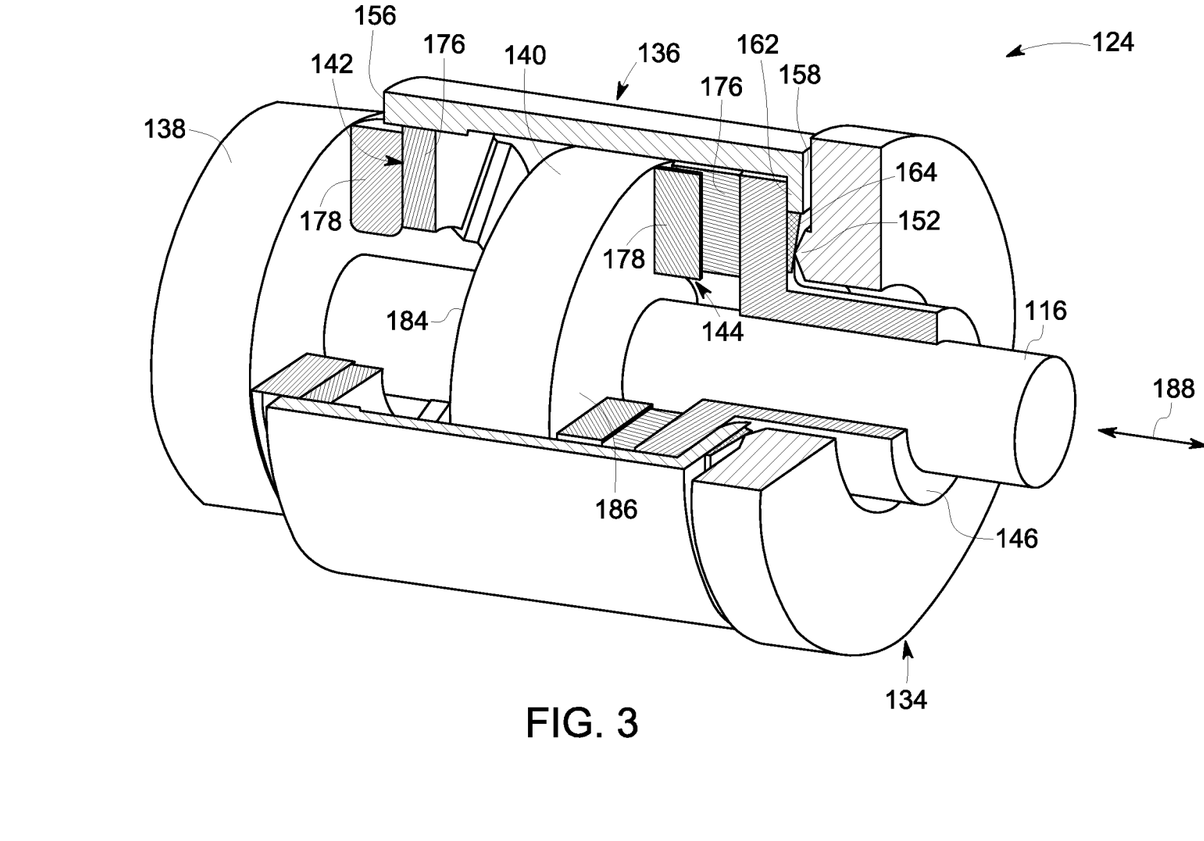
FIG. 3 is a perspective view of the assembled bearing system in accordance with the exemplary embodiment of FIG. 2.

FIG. 3 is a perspective view of the assembled bearing system 124 in accordance with the exemplary embodiment of FIG. 2. In the illustrated embodiment, the first thrust collar 138 and second thrust collar 140 are axially spaced apart from each other and coupled to the shaft 116. The first bearing unit 142 is disposed between the first thrust collar 138 and a first side 184 of the second thrust collar 140. The first bearing unit 142 contacts the first thrust collar 138 and is coupled to the housing 136. Specifically, the pad 178 of the first bearing unit 142 contacts the first thrust collar 138 and the metal base 176 of the first bearing unit 142 is coupled to the first end portion 156 of the housing 136. The second bearing unit 144 is disposed between a second side 186 of the second thrust collar 140 and the second end portion 158 of the housing 136. The second bearing unit 144 contacts the second thrust collar 140. Specifically, the pad 178 of the second bearing unit 144 contacts the second thrust collar 140. The plurality of flexible elements 166 of the housing 136 contacts the plurality of projections 152 of the stationary element 134. The shaft 116 and the second thrust collar 140 are disposed within the housing 136. The mechanical component 146 extends along the shaft 116 and contacts the metal base 176 of the second bearing unit 144 and the second end portion 158 of the housing 136. When subjected to an axial thrust load, the projections 152 of the stationary element 134, contact and bend the flexible portion 164 of the housing 136, to push the mechanical component 146 along an axial direction 188 of the shaft 116, and bias the second bearing unit 144 against the second thrust collar 140.

Figure 4:
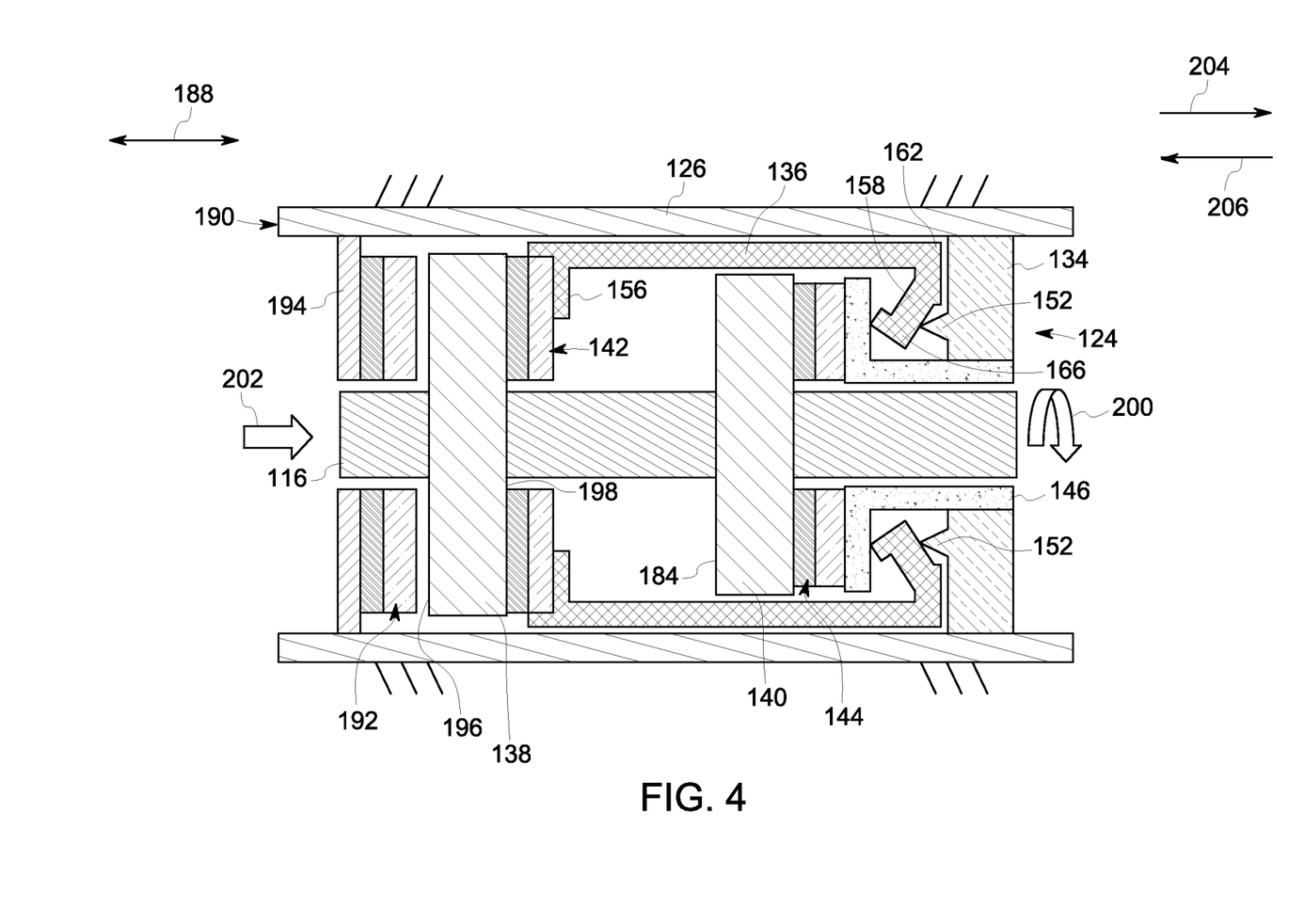
FIG. 4 is a schematic view of the bearing system and a portion of a seal unit in accordance with the exemplary embodiments of FIGS. 1, 2, and 3.

FIG. 4 is a schematic diagram of the bearing system 124 and a portion 190 of the seal unit 110 in accordance with the exemplary embodiments of FIGS. 1, 2, and 3. The stationary element 134 of the bearing system 124 is coupled to the casing 126 of the seal unit 110.

In the illustrated embodiment, the bearing system 124 further includes a third bearing unit 192 coupled to another stationary element 194 and is disposed proximate to a first side 196 of the first thrust collar 138. The stationary element 194 is coupled to the casing 126. The first bearing unit 142 is disposed proximate to a second side 198 opposite to the first side 196, of the first thrust collar 138. Specifically, the first bearing unit 142 contacts the second side 198 of first thrust collar 138.

During operation, the shaft 116 is rotated, as indicated by reference numeral 200, by the motor 108, which in turn rotates the impeller 118 disposed within the pump 114 (as shown in FIG. 1). The rotating impeller 118 applies an axial thrust load as indicated by the reference numeral 202 on the shaft 116. The applied axial thrust load 202 causes the shaft 116 to move axially 188 along a first direction 204, thereby biasing the first thrust collar 138 against the first bearing unit 142. The first bearing unit 142 further moves the housing 136 axially 188 along the first direction 204. The axial movement of the housing 136 causes each projection among the plurality of projections 152 to contact and bend a corresponding flexible element among the plurality of flexible elements 166. The bending of the corresponding flexible element 166 pushes the mechanical component 146 axially 188 along a second direction 206 opposite to the first direction 204, to bias the second bearing unit 144 against the second thrust collar 140. The generated axially thrust load is distributed properly between the first and second bearing units 142, 144.

The operation of the bearing system 124 further includes biasing the first thrust collar 138 against the third bearing unit 192 during start up and/or abnormal operating condition of the ESP 100. The third bearing unit 192 is configured to support sudden jerk and/or abnormal axial thrust load applied on the shaft 116 by the plurality of impellers 118.

The first and second bearing units 142, 144 are configured to constantly support the applied axial load during the operation of the ESP 100. The first bearing unit 142 having a greater diameter, is configured to support a greater axial thrust load in comparison with the second bearing unit 144 having a smaller diameter.

In accordance with one or more embodiments discussed herein, an exemplary bearing system facilitates to support and distribute an axial thrust load between a first bearing unit and a second bearing unit. The ratio of distribution of the axial thrust load between the first bearing unit and the second bearing unit may vary depending on a diameter of the first and second bearing units. Further, the bearing system facilitates a very stable operating environment for an electrical submersible pump (ESP), thereby resulting in less wear and tear of the first and second bearing units.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:
1. A system comprising:
a stationary element, wherein the stationary element includes at least one projection;

a housing comprising a first end portion and a second end portion, wherein the housing is configured to move in a first axial direction, and wherein the second end portion includes a flexible portion that deflects in a second axial direction opposite to the first axial direction when the flexible portion contacts the at least one projection of the stationary element as the housing moves in the first axial direction;

a shaft disposed at least partially within the housing;

a first thrust collar and a second thrust collar axially spaced apart from each other and coupled to the shaft, wherein at least the second thrust collar is disposed within the housing;

a first bearing unit disposed between the first thrust collar and a first side of the second thrust collar, wherein the first bearing unit contacts the first thrust collar and is coupled to the first end portion;

a second bearing unit disposed between a second side opposite to the first side of the second thrust collar and the second end portion, wherein the second bearing unit contacts the second thrust collar; and a mechanical component extending along the shaft and contacting the second bearing unit and the flexible portion of the second end portion, wherein the mechanical component is configured to move in the second axial direction in response to the deflection of the flexible portion in the second axial direction to bias the second bearing unit against the second thrust collar.

2. The system of claim 1, further comprising a third bearing unit disposed proximate to a first side of the first thrust collar, wherein the first bearing unit is disposed proximate to a second side opposite to the first side of the first thrust collar.

3. The system of claim 2, wherein at least one of the first, second, and third bearing units, comprises a tilting pad thrust bearing.

4. The system of claim 2, wherein at least one of the first, second, and third bearing units, comprises a fixed pad thrust bearing.

5. The system of claim 1, wherein the stationary element comprises a plurality of projections.

6. The system of claim 5, wherein the flexible portion of the second end portion comprises at least one flexible element.

7. The system of claim 6, wherein the flexible portion includes a plurality of flexible elements and a plurality of slots, wherein each of the plurality of slots is located between a corresponding pair of the flexible elements.

8. The system of claim 1, wherein the mechanical component comprises a first annular component and a second annular component coupled to the first annular component, wherein the first second annular component is disposed along the shaft.

9. The system of claim 8, wherein the first annular component is disposed within the housing and the second annular component is disposed along the shaft, extending between the second end portion of the housing and the stationary element.

10. An apparatus comprising:
a pump;
a motor; and
a seal unit disposed between and coupled to the pump and the motor; the seal unit comprising:
a casing; and
a system comprising:

a stationary element coupled to the casing, wherein the stationary element includes at least one projection;

a housing comprising a first end portion and a second end portion, wherein the housing is configured to move in a first axial direction and wherein the second end portion includes a flexible portion that deflects in a second axial direction opposite to the first axial direction when the flexible portion contacts the at least one projection of the stationary element as the housing moves in the first axial direction;

a shaft disposed at least partially within the housing;

a first thrust collar and a second thrust collar axially spaced apart from each other and coupled to the shaft, wherein at least the second thrust collar is disposed within the housing;

a first bearing unit disposed between the first thrust collar and a first side of the second thrust collar, wherein the first bearing unit contacts the first thrust collar and is coupled to the first end portion;

a second bearing unit disposed between a second side opposite to the first side of the second thrust collar and the second end portion, wherein the second bearing unit contacts the second thrust collar; and a mechanical component extending along the shaft and contacting the second bearing unit and the flexible portion of the second end portion, wherein the mechanical component is configured to move in the second axial direction in response to the deflection of the flexible portion in the second axial direction to bias the second bearing unit against the second thrust collar.

11. The apparatus of claim 10, further comprising a third bearing unit is coupled to the casing and disposed proximate to a first side of the first thrust collar, wherein the first bearing unit is disposed proximate to a second side opposite to the first side of the first thrust collar.

12. The apparatus of claim 11, wherein at least one of the first, second, and third bearing units, comprises a tilting pad thrust bearing.

13. The system of claim 11, wherein at least one of the first, second, and third bearing units, comprises a fixed pad thrust bearing.

14. The apparatus of claim 10, wherein the stationary element comprises a plurality of projections.

15. The apparatus of claim 14, wherein the flexible portion of the second end portion comprises at least one flexible element.

16. The apparatus of claim 15, wherein the flexible portion includes a plurality of flexible elements and a plurality of slots, wherein each of the plurality of slots is located between a corresponding pair of the flexible elements.

17. A method comprising:
applying an axial thrust load on a shaft disposed at least partially within a housing, wherein the housing comprises a first end portion and a second end portion, wherein the second end portion includes a flexible portion that is configured to contact a projection on a stationary element;

biasing a first thrust collar against a first bearing unit, wherein the first thrust collar is coupled to the shaft and the first bearing unit is coupled to the first end portion;

moving the housing via the first bearing unit in a first axial direction to force the flexible portion into contact with the projection of the stationary element;

bending at least one flexible element of the flexible portion in a second axial direction that is opposite to the first axial direction by pressing the flexible element into the projection of the stationary element;

pushing a mechanical component along the second axial direction via the at least one flexible element to bias a second bearing unit against a second thrust collar; and distributing the axial thrust load between the first bearing unit and the second bearing unit.

18. The method of claim 17, further comprising biasing the first thrust collar against a third bearing unit, wherein the third bearing unit is coupled to a casing and wherein the first bearing unit is disposed proximate to a second side opposite to a first side of the first thrust collar.

\* \* \* \* \*